Sept. 1, 1931. W. F. KILKER 1,821,550
VEHICLE BRAKE
Filed Nov. 12, 1928
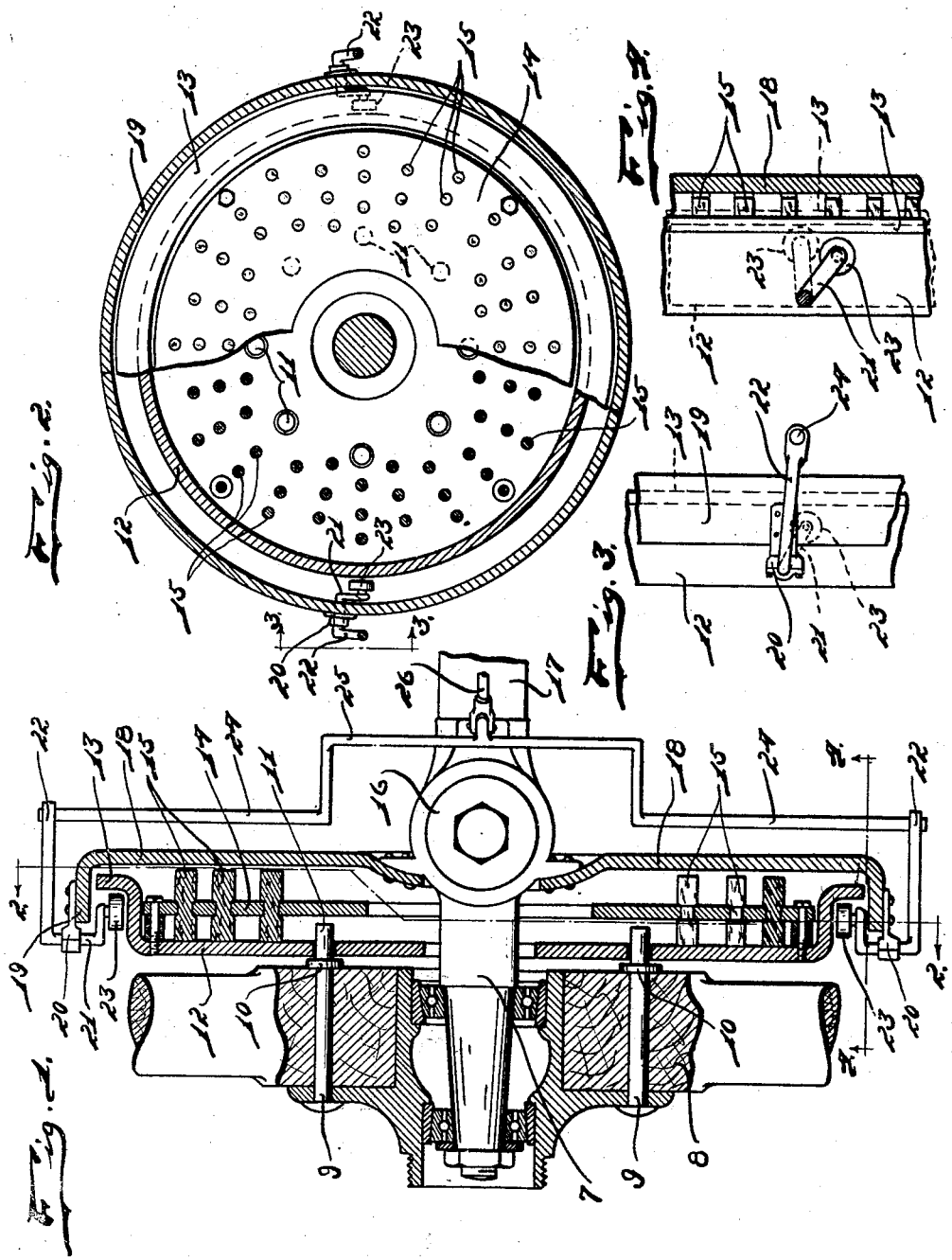
INVENTOR.
William F. Kilker.
BY Thos. J. Donnell
ATTORNEY.

Patented Sept. 1, 1931

1,821,550

UNITED STATES PATENT OFFICE

WILLIAM F. KILKER, OF DETROIT, MICHIGAN

VEHICLE BRAKE

Application filed November 12, 1928. Serial No. 318,738.

My invention relates to a new and useful improvement in a vehicle brake and has for its object the provision of a brake which may be used on all four wheels of the vehicle or on only two of the wheels of the vehicle, as desired.

It is an object of the present invention to provide a brake which will be easily and quickly operated and efficient in the maximum degree.

Another object of the invention is the provision of an axially movable friction member engageable with a stationery member for braking purposes.

Other objects will appear hereinafter.

The invention consists in the combination and arrangement of parts hereinafter described and claimed.

The invention will be best understood by a reference to the accompanying drawings which forms a part of this specification, and in which, Fig. 1 is a central vertical sectional view of the invention.

Fig. 2 is a view taken on line 2—2 of Fig. 1.

Fig. 3 is a fragmentary view taken on line 3—3 of Fig. 1.

Fig. 4 is a fragmentary view taken on line 4—4 of Fig. 1.

In the drawings I have illustrated a vehicle wheel 8 as mounted on the spindle 7. Pins 9 are projected through the hub flange of the wheel and provided with a collar 10 and a projecting end 11 which projects through the disc 12 which has a peripheral flange axially extended and angularly turned as at 13. A flange block carrying the plate 14 is mounted on the disc 12 and carries yieldable friction engaging members 15, formed from cork or other suitable material. These members 15 are preferably cylindrical in form and are projected in a press fit, through openings in the disc 12. Mounted on the knuckle 16, which serves to attach the spindle 7 to the axle 17 is a brake drum 18 against which the members 15 are adapted to engage when used for braking purposes. A peripheral axially extended flange 19 is provided on the drum, and secured to and projecting outwardly from the flange 19 are bearing brackets 20 in which is rockably mounted the bight 21 of the U-shaped member, the longer leg 22 of which is connected to the operating rod 24 having the U-shaped portion 25 intermediate its ends and connected to a suitable operating rod 26. A collar 23 is mounted on the other leg of the U-shaped member.

In operation a pulling or a pushing on the rod 26, depending upon the installation, will effect a rocking of the leg 22 so as to bring the collar 23 into engagement with the flange 13 and force the engagement members 15 into engagement with the drum 18, this drum being stationary and the disc 12 rotating with the wheel. It is obvious that in this operation the disc 12 is moved axially toward the drum 18 and slides on the pins 11.

In this way there is provided a device whereby a braking over a large area may be effected and an efficient retarding of the rotation of the wheel quickly effected. The simplicity of the device is believed apparent as well as the economy of manufacture.

While I have illustrated and described the preferred form of my invention, I do not wish to limit myself to the precise details of structure shown but desire to avail myself of such variations and modifications as come within the scope of the appended claims.

Having thus described my invention what I claim as new and desire to secure by Letters Patent is:

1. A vehicle brake of the class described comprising: a supporting member mounted on and rotatable with and axially moveable of a vehicle wheel; a disc mounted on said supporting member; a plurality of spaced yieldable friction members mounted on said disc; a stationary engagement member for engaging said friction members upon movement of said supporting member axially of said wheel in one direction; and rockable means engageable with said supporting member adjacent its periphery for moving said supporting member axially of said wheel in one direction; and means for rocking said rockable means.

2. A vehicle brake of the class described adapted for use with a rotatably mounted vehicle wheel comprising a circular disc-like member mounted upon and rotatable with said wheel, a portion of said member adjacent its periphery, being axially turned and then angularly turned to provide a radially extending offset portion; a carrying plate mounted on said disc; friction members mounted on said carrying member, said carrying member and said disc being axially movable relatively to said wheel; a stationary engagement member for engaging said friction members upon movement axially of said plate and said disc, a predetermined distance in one direction; and rockable means engaging with said radially extending offset portion of said disc for, upon rocking, moving said disc and said carrying member into approach relatively to said stationary engagement member.

In testimony whereof I have signed the foregoing specification.

WILLIAM F. KILKER.